Sept. 30, 1958  M. H. A. VAN DE WEIJER ET AL  2,854,600
LOW-PRESSURE MERCURY-VAPOUR DISCHARGE LAMP
Filed Aug. 9, 1956
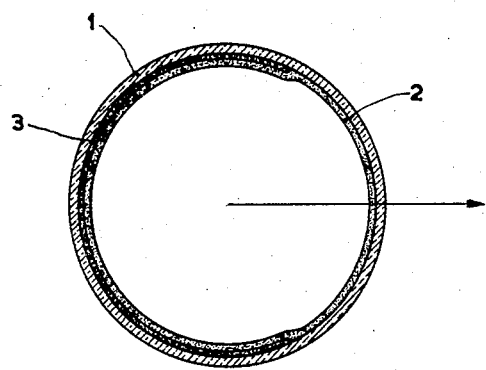
INVENTOR
MARTINUS HENRICUS ADRIANUS VAN DE WEYER
WILLEM LAMBERTUS WANMAKER
BY
AGENT

# 2,854,600

LOW-PRESSURE MERCURY-VAPOUR DISCHARGE LAMP

Martinus Henricus Adrianus van de Weijer and Willem Lambertus Wanmaker, Eindhoven, Netherlands, assignors, by mesne assignments, to North American Philips Company, Inc., New York, N. Y., a corporation of Delaware Application August 9, 1956, Serial No. 603,128

Claims priority, application Netherlands August 26, 1955

8 Claims. (Cl. 313—109)

The invention relates to fluorescent lamps containing a reflector, and in particular to low-pressure mercury-vapour discharge lamps provided with a layer which fluoresces during operation and part of which is spaced apart from the inner wall of the lamp by a reflecting layer.

In known lamps of this kind, the reflecting layer consists of magnesium oxide in order to ensure a maximum reflection of the ultra-violet resonance radiation of the mercury vapour discharge having a wavelength of 2537 A. units, which reflection in the said case is about 95%.

These known lamps exhibit a heavy blackening during life so that the amount of light produced rapidly falls off. In addition, the reflecting layer has poor adherence to the lamp wall.

It is an object of the invention to provide an improved low-pressure mercury-vapour discharge lamp of the said kind.

According to the invention, the reflecting layer is a non-metallic layer which is built up from a powder having an index of refraction for visible light of more than 1.9 and a grain size of less than 1 micron.

The invention is based on recognition of the fact that the choice of the material of the reflecting layer need not be determined by the desire for strong reflection of the ultra-violet radiation having a wavelength of 2537 A., for the fluorescent layer can without difficulty be made so thick that substantially the entire ultra-violet radiation is absorbed in this layer. Obviously, the thickness of the fluorescent layer can be decreased in proportion as the said ultra-violet radiation is more highly reflected by the reflecting layer chosen. With a reflection of 100%, one half of the fluorescent layer thickness will be satisfactory. In addition, the invention is based on recognition of the fact that a high index of refraction and a small grain size permit the use of a reflecting layer of small thickness. A thin reflecting layer means satisfactory adherence, low absorption and slight blackening. It should be mentioned that magnesium oxide has an index of refraction of only 1.5.

Preferably the grain size of the powdered reflecting layer is 0.3 micron which is one half of the wavelength of visible light. As the grain size of the preferred embodiment is about 0.3 micron, obviously the thickness of the reflecting layer in this preferred embodiment, which layer will be at least one grain thick, will exceed 0.3 micron.

In order to ensure satisfactory adherence, the thickness of the reflecting layer preferably is less than 15 microns.

Preferably the reflecting layer consists of titanium oxide.

In tubular lamps provided with a slit-shaped window (i. e. the part of the tube which is not covered with a reflecting layer) the luminous intensity at right angles to the tube axis has a maximum or minimum value, respectively, in the plane of symmetry passing through the window. In practice, the maximum luminous intensity is obtained in the said lamps when the reflecting layer covers a part of the inner circumference of the tube wall corresponding to an angle of between 180° and 270°.

As examples of substances having a high index of refraction we may mention:

|  | Index of refraction |
|---|---|
| Zinc oxide | 2.02 |
| White lead | 1.94–2.09 |
| Antimony oxide | 2.09–2.29 |
| Zinc sulphide | 2.37 |
| Zirconium oxide | 2.40 |
| Titanium oxide: |  |
| Anatase | 2.55 |
| Rutile | 2.70 |

In order that the invention may readily be put into effect, one embodiment thereof will now be described more fully with reference to the accompanying drawing, the single figure of which is a cross-sectional view of a lamp in accordance with the invention.

In the figure, reference numeral 1 designates the usual transparent glass wall of an envelope of a low-pressure mercury-vapour discharge lamp having a length of about 120 cms. and an outer diameter of about 3.8 cms. The lamp is provided at its ends in the usual manner with activated hot electrodes and is proportioned for a tube voltage of about 105 volts and a discharge current of about 420 milliamperes.

The side of the wall 1 nearer the discharge is provided with a conventional fluorescent layer 2, for example a layer of manganese-activated halogen phosphate of thickness about 20 microns, which corresponds to a weight of about 3 milligrammes per square centimetre. This layer thickness is sufficient for substantially the entire ultra-violet radiation of the discharge to be absorbed.

The lamp so far described corresponds to a conventional 40 watt fluorescent lamp.

In accordance with the invention, in the lamp shown provision is made, on the glass wall 1 and between the latter and the fluorescent layer 2 through an angle at the centre of the lamp cross-section of about 230°, of a reflecting layer 3 of titanium oxide in the rutile modification having a grain size of about 0.3 micron and a layer thickness of about 10 microns, which corresponds to a weight of about 2 mgms. per square cm. The reflecting power of rutile for the wavelength of 2537 A. is only about 7%. Consequently, the thickness of the reflecting layer is in this case less than that of the fluorescent layer.

The maximum value of the luminous intensity of the lamp in the direction of the arrow is about 180% and in the opposite direction about 35% of that of the conventional 40 watt lamp. The total luminous flux of the lamp provided with a reflecting layer is slightly more than 90% of a lamp not provided with a reflecting layer.

The total luminous flux of the novel lamp after 100 hours is about 97%, after 500 hours about 93% and after 1000 hours about 91% of the zero-hour value. These percentages are substantially the same as in the conventional lamp, though, of course, the latter produces much less usable total flux.

It should be noted that, if the same maximum value of the luminous intensity of 180% is to be produced with the use of a layer of magnesium oxide, of which powder the smallest commercially available grain size is about 2 microns, a layer thickness of about 100 microns must be used, which corresponds to a weight of about 12 mgms. per square cm., which is not admissible for technological reasons, while at zero hours the light losses are about twice those in the titanium oxide lamp.

If, however, a maximum value of the luminous intensity of 160% is considered sufficient, with titanium oxide a layer thickness of about 5 microns and with magnesium oxide a thickness of about 30 microns is required.

In this latter case, the luminous flux with titanium oxide after 100 hours is about 97%, after 500 hours about 93% and after 1000 hours about 91% of the zero-hour value; with magnesium oxide, however, the initial value of the luminous flux is 93% only of the zero-hour value of the titanium oxide lamp and this value after 100, 500, and 1000 hours, respectively, is only about 89%, 84% and 81%, respectively, of the zero hour value of the titanium oxide lamp. Thus it will be evident that the lamp of the invention is a decided improvement over the prior art construction.

What is claimed is:

1. A mercury-vapor discharge lamp comprising an envelope having wall portions and containing a gas filling including mercury vapor, a fluorescent layer in said envelope and responsive to ultra-violet radiation, and a single reflecting layer disposed between a portion of the fluorescent layer and the envelope wall, said reflecting layer being constituted of non-metallic powder particles having a grain size less than one micron and having an index of refraction for visible light of more than 1.9.

2. A low-pressure mercury-vapor discharge lamp comprising a substantially transparent, vitreous envelope containing a gas filling including mercury vapor, a reflecting layer inside the envelope and on a portion of the envelope wall, and a fluorescent layer responsive to ultra-violet radiation inside the envelope and on the wall thereof and overlying the reflecting layer, said reflecting layer being constituted of non-metallic powder particles having a grain size less than one micron and having an index of refraction for visible light of more than 1.9.

3. A lamp as set forth in claim 2 wherein the powder particles have a grain size of about 0.3 micron, and the reflecting layer has a thickness in excess of 0.3 micron.

4. A lamp as set forth in claim 3 wherein the powder particles are of titanium oxide.

5. A lamp as set forth in claim 2 wherein the envelope is tubular, and the reflecting layer covers a portion of the envelope wall, measured at a cross-section through the envelope, subtending an angle between 180° and 270°, thereby to form an elongated aperture along a wall portion of the envelope for the passage of light.

6. A low-pressure mercury-vapor discharge lamp comprising a glass envelope containing a gas filling including mercury vapor, a reflecting layer mounted directly on an inner wall portion of said envelope, said reflecting layer having a thickness less than about 15 microns but more than about 0.3 micron and being constituted of non-metallic powder particles having a grain size less than one micron and having an index of refraction for visible light of more than 1.9, and a continuous fluorescent layer within said envelope and responsive to the ultra-violet radiation produced during a discharge in said lamp, said fluorescent layer including a first portion mounted directly on and over said reflecting layer and a second portion mounted directly on a portion of the envelope wall free of said reflecting layer, said fluorescent layer having a thickness greater than that of said reflecting layer.

7. A lamp as set forth in claim 6, wherein the reflecting layer is constituted of titanium oxide, and the fluorescent layer has a thickness at which almost complete absorption of the ultra-violet radiation produced during a discharge in the lamp occurs.

8. A lamp as set forth in claim 1, wherein the envelope is glass and includes a low-pressure gas filling, and the reflecting layer is very thin, is mounted directly on an inner wall portion of the glass envelope, and is comprised of non-metallic powder particles constituted of a material selected from the group consisting of rutile and anatase titanium oxide.

References Cited in the file of this patent

UNITED STATES PATENTS

| 2,451,043 | Pennybacker | Oct. 12, 1948 |
| 2,519,722 | Turner | Aug. 22, 1950 |

FOREIGN PATENTS

| 949,114 | France | Aug. 22, 1949 |